United States Patent

Kittrell

[15] 3,639,271
[45] Feb. 1, 1972

[54] METHOD FOR MAKING MULTI-COMPONENT CATALYSTS

[72] Inventor: James R. Kittrell, El Cerrito, Calif.
[73] Assignee: Chevron Research Company, San Francisco, Calif.
[22] Filed: Dec. 3, 1969
[21] Appl. No.: 881,883

[52] U.S. Cl. ...........................252/441, 252/452, 252/455 Z
[51] Int. Cl. .....................................B01j 11/78, B01j 11/40
[58] Field of Search ..............252/441, 442, 452, 453, 455 Z

[56] References Cited

UNITED STATES PATENTS 3,523,912  8/1970  Jaffe ...............................252/453 X Primary Examiner—C. F. Dees
Attorney—A. L. Snow, F. E. Johnston, George F. Magdeburger, Charles J. Tonkin and Roy H. Davies

[57] ABSTRACT

Method for producing a coprecipitated solid comprising a crystalline zeolitic molecular sieve, at least one metal oxide having isomerization activity, at least one hydrogenating component and a component comprising titanium, comprising coprecipitating at a pH of 8.2 to 10.2 a mixture comprising said crystalline zeolitic molecular sieve, a precursor compound of said metal oxide, a precursor compound of said hydrogenating component, and a compound of titanium, at least of one of said compounds being a metal chloride, reducing the chloride content of the resulting coprecipitate below about 0.25 weight percent of the whole weight thereof, and drying the resulting coprecipitate to produce said coprecipitated solid.

3 Claims, No Drawings

METHOD FOR MAKING MULTI-COMPONENT CATALYSTS

This invention relates to a method for producing a coprecipitated solid, comprising a crystalline zeolitic molecular sieve, at least one metal oxide having isomerization activity, at least one hydrogenating component, and a component comprising titanium.

As is well known to those skilled in the catalyst art, a gel, including both xerogels and aerogels, is produced by dehydration, generally by heating, of a hydrogel or gelatinous precipitate. A hydrogel can be defined as a rigid material containing a continuous phase of a network of colloidal particles and an imbibed liquid phase. A gelatinous precipitate is similar to a hydrogel, but without the characteristic of a rigid structure. It is also well known that metal oxide-containing gels have long been employed as catalysts and/or catalyst supports. Numerous methods of making such composites have been suggested, most of which have been directed to the particular components of the initial gel, the manner of forming the gel, and in various techniques for removing undesirable components from the formed gel.

OBJECTS

An object of the present invention is to provide a process for producing catalysts, particularly hydrocracking and denitrification catalysts, that have unusually high activity for their intended purposes. Another object is to provide a process for manufacturing certain catalysts of greater regenerability than other similar catalysts. Further objects will be apparent from the disclosures herein.

STATEMENT OF INVENTION

The present invention is directed to a method for producing a coprecipitated solid comprising a crystalline zeolitic molecular sieve, at least one metal oxide having isomerization activity, at least one hydrogenating component, and a component comprising titanium, which comprises coprecipitating at a pH of 8.2 to 10.2 a mixture comprising said crystalline zeolitic molecular sieve, a precursor compound of said metal oxide, a precursor compound of said hydrogenating component, and a compound of titanium, at least one of said compounds being a metal chloride, reducing the chloride content of the resulting coprecipitate below about 0.25 percent of the total weight thereof, and drying the resulting hydrogel coprecipitate, containing said crystalline zeolitic molecular sieve, to produce said coprecipitated solid.

Said precursor compound of said hydrogenating component is a compound of a metal, the sulfide, oxide or metal form of which has catalytic hydrogenation activity.

PRIOR ART PARTIAL IMPREGNATION

Methods Contrasted

The present method, requiring the simultaneous coprecipitation of the molecular sieve-containing hydrogel composite, produces a gelatinous material containing said molecular sieve and at least three different precipitated metal compounds. This must be contrasted with prior art methods of preparing a solid composite containing a molecular sieve and three additional components, such as coprecipitating only two metal compounds together with a molecular sieve, dehydrating the resulting coprecipitate, and thereafter disposing a third metal component onto the coprecipitate by such conventional techniques as impregnation or sublimation. Although additional metal components can be impregnated upon the coprecipitate composite produced by the present process if desired, it is required that the initial coprecipitate contain at least three different metal compounds.

ADVANTAGES OF PROCESS OF PRESENT INVENTION

It has been found that the catalysts produced by the method of the present invention are very much superior to four-component catalysts (one of the four components being a molecular sieve) produced by impregnation of a coprecipitated three-component composite with a fourth component. This marked superiority has been exemplified in the comparison of numerous catalysts. For example, four-component hydrocracking catalysts prepared according to the present method have been found to have higher catalyst activities, lower fouling rates, and better selectivities than catalysts of similar composition prepared by other methods. The reasons for this superiority are not completely understood, but it is believed to be attributable to a combination of factors, including presence of a crystalline zeolitic molecular sieve, precipitation from basic side, presence of a compound of titanium, and reduction of chloride content.

The presence of the crystalline zeolitic molecular sieve component, such as faujasite, improves the activity and fouling rate of the finished catalyst. Prior art methods of producing a coprecipitated catalyst containing at least three different metal compounds teach precipitation from an acidic solution, that is, by mixing catalytic metals at a pH below 3 and precipitating by raising the pH. See, for example, Joseph Jaffe U.S. Pat. No. 3,401,125. Indeed, such catalysts coprecipitated from the acidic side, when they do not contain a crystalline zeolitic molecular sieve, are superior to similar catalyst compositions, also not containing a crystalline zeolitic molecular sieve, which have been coprecipitated from the basic side. Surprisingly, it has been found that when a crystalline zeolitic molecular sieve component is included in the catalyst, a superior catalyst is achieved by coprecipitating the components from the basic side, in a pH range from 8.2 to 10.2 It is believed that this results from a better dispersion of the zeolite throughout the catalytic matrix, which is in turn possible because basic coprecipitation permits the molecular sieve to be mixed with a silicate solution or an analog thereof prior to precipitation.

Mixture Comprising Crystalline Zeolitic Molecular Sieve and at Least Three Different Metal Compounds Must be in Solution or Sol Form At least three different metal compounds must be present in the initial mixture. In addition, the mixture comprising these compounds must be in the form of a solution and/or sol, so that said compounds will be uniformly dispersed throughout the mixture.

At Least One Precursor Compound of a Metal Oxide Having Catalytic Isomerization Activity, that is, at Least One Compound of a Metal an Oxide of Which has Catalytic Isomerization Activity Further, the present method requires that at least one of the initial metal compounds (that will subsequently be converted to the corresponding oxide by dehydration of the coprecipitate) be a compound of a metal an oxide of which, alone or in admixture with a different metal compound, has catalytic in isomerization activity. Such activity is almost always dependent upon the particular metal oxide being acidic in character. Although a number of metal oxides, alone or in admixture with a different metal compound, possess this isomerization activity, a compound of aluminum has been found to be particularly effective for use in the subject method, because alumina alone and in combination with at least one compound of at least one different metal has the desired isomerization activity. Some metal oxides do not have the desired isomerization activity alone, but can be combined with at least one other metal oxide to produce a mixture having high-isomerization activity. For example, silica alone has essentially no isomerization activity, but when combined with alumina, magnesia, zirconia, titania, thoria, hafnia, or the like, the mixture has high-isomerization activity. Accordingly, in the present process an aluminum salt should be employed in the initial mixture, or a combination of at least two of the following metal salts: aluminum, magnesium, silicon, titanium, thorium, zirconium, hafnium, and such rare earths as cerium, samarium, and europium. Preferred combinations are silica-alumina, silica-alumina-titania, silica-alumina-zirconia, and silica-magnesia, with silica-alumina-titania being especially preferred.

*At Least One Precursor Compound of a Hydrogenating Component, that is, at Least One Compound of a Metal Which in the Sulfide, Oxide or Metal Form Has Hydrogenation Activity*

In addition to the use of at least one salt of a metal an oxide of which, alone or in admixture with a different metal compound, has catalytic isomerization activity, it is required that the initial mixture contain at least one metal compound precursor of a Group VI and/or Group VIII metal, metal sulfide, and/or metal oxide hydrogenating component of the final catalytic material. Preferably, at least one salt of the Group VI or Group VIII metals is used in the initial mixture in the present process. At least one salt of a Group VI metal may be used together with at least one salt of a group VIII metal, to produce highly desirable catalysts containing, for example, as such or in the form of compounds, nickel and molybdenum and nickel and tungsten.

When it is desired to produce by the present method a catalyst comprising nickel or a compound thereof in combination with silica-alumina, an unusually active catalyst can be made by including a tin salt, e.g., stannous chloride, in the initial mixture. It has been found that tin or a compound thereof in the final catalyst increases the hydrogenation activity of the nickel or nickel compound, or at least that the combination has greater hydrogenation activity than nickel or a nickel compound alone.

AT LEAST ONE METAL CHLORIDE

The requirement that at least one of the metal components in the initial mixture be a metal chloride presents somewhat of an anomaly inasmuch as a subsequent step in the preparation involves the reduction of the chloride level below about 0.25 percent of the total weight of the final coprecipitate. This anomaly resides in the fact it has been found that chloride, in addition to certain other components such as sulfate and alkali metal compounds, have a deleterious effect upon the activity, regenerability, and/or the fouling rate of a number of catalysts. However, in view of the process advantages of using chloride salts due to their readiness to form solutions with other metal compounds, their commercial availability and relatively low price, it is often desirable to employ them. Thus, the present invention requires that at least one of the metal salts in the initial mixture be a chloride while also requiring that the chloride level of the final coprecipitate be reduced to below 0.25 percent by weight, and preferably below about 0.1 percent by weight, of the final composite.

AT LEAST ONE COMPOUND OF TITANIUM

When titanium, in the metal, oxide or sulfide form, is present in the final catalyst prepared by the process of the present invention as a result of the presence of a compound thereof in the initial mixture, it has been found that catalyst activity is significantly higher than when titanium or zirconium in one of these forms is not present. The titanium, or compound thereof, preferably is present in the final catalyst in the amount of 3 to 15 percent by weight, based on the total catalyst. The higher activity is noted for both denitrification, in the case of denitrification catalysts, and for hydrocracking, in the case of hydrocracking catalysts. The higher activity can be obtained by using zirconium instead of titanium. However, it has been found most unexpectedly that, while zirconium and titanium are essentially equivalent for purposes of activity enhancement of the final catalyst, (a) the catalyst has only moderately good regeneration characteristics when it contains zirconium or a compound thereof, but no titanium or compound thereof, but (b) the catalyst has most excellent regeneration characteristics when it contains titanium or a compound thereof. Accordingly, it is necessary for purposes of the present invention that a compound of titanium be present in the initial mixture. A compound of zirconium also may be present if desired.

A CRYSTALLINE ZEOLITIC MOLECULAR SIEVE

The present method requires that a crystalline zeolitic molecular sieve component be in intimate admixture with the other catalyst components. The molecular sieve is preferably added to the silicate solution or silica sol prior to addition of other metal compounds. Then additional metal compounds are added along with sufficient base, such as ammonium hydroxide, to maintain the pH of the mixture between 10.2 and 11. The pH is lowered slowly to complete precipitation.

The molecular sieve component may be added in any desired proportions, preferably 10–45 percent by weight, more preferably 15–35 percent by weight, based on the total finished catalyst.

TIN OR A COMPOUND THEREOF

When tin, in the metal, oxide or sulfide form, is present in the final catalyst prepared by the process of the present invention, as a result of the presence of a compound of tin in the initial mixture, it has been found that compared with the same catalyst with no tin present: (a) the cracking activity is higher, in the case of a hydrocracking catalyst; (b) the hydrogenation activity is higher, in the case of both hydrocracking and hydrofining catalysts, and particularly in the case of a hydrocracking catalyst comprising nickel or a compound thereof and silica-alumina; and (c) the hydrogenation activity can be controlled in an essentially reversible manner by varying the amount of sulfur present in the hydrocarbon feed. The tin or compound thereof preferably is present in the amount of 1 to 30 percent, preferably 2 to 15 percent, by weight, based on the total catalyst.

REPRESENTATIVE CATALYSTS

Especially useful catalysts that can be made by the process of the present invention are those having the following combinations of components, the catalysts being useful in the metallic, oxide or sulfide forms:

1. Ni
   W
   Ti
   $SiO_2$-$Al_2O_3$ with added molecular sieves
2. Ni
   Ti
   $SiO_2$-$Al_2O_3$ with added molecular sieves
3. Ni
   Sn
   Ti
   $SiO_2$-$Al_2O_3$ with added molecular sieves
4. Pd
   Ti
   $SiO_2$-$Al_2O_3$ with added molecular sieves
5. Ni
   Mo
   Ti
   $SiO_2$-$Al_2O_3$ with added molecular sieves

MISCELLANEOUS CATALYST

Preparation Considerations

Any of the catalysts prepared by the present process may be fluorided by conventional methods if desired.

As noted above, it is often preferred that at least a portion of the initial mixture be in the form of a sol. For example, it is generally desirable to employ silica sols when silica is to be a component of the coprecipitate. In such a case, the silica sol can be made by any conventional procedure. A number of methods for producing such a sol are known to those skilled in the art. Thus, silica sols can be made by hydrolyzing tetraethyl orthosilicate when an aqueous HCl solution, or in the presence or absence of solvents, such as alcohols containing one to four carbon atoms per molecule, acetone, methylethyl ketone, and the like. Likewise, silica sols can be prepared by contacting silicon tetrachloride with a cold methanol and water solution, or with 95 percent ethyl alcohol, or with cold water or ice. Also, silica sols can be made by contacting sodium silicate with an ion exchange resin to remove the sodium, or by contact with an acid at pH of about 2.5 or less. Likewise, if alumina is a desired component of the final coprecipitate, it is entirely feasible to employ alumina sols in the initial mixture. A sol of hydrous alumina can be prepared by reacting aluminum metal with dilute hydrochloric acid or with aluminum chloride solution, with or without a catalyst. Also, alumina sols can be prepared by reacting aluminum metal with a weak acid, such as formic or acetic acid.

As discussed above, at least one of the components of the initial mixture must be a metal chloride, and often it is desirable to incorporate at least one sol, such as a silica or alumina sol, in this mixture. Other metal salts can also be present. Suitable salts are the nitrates, citrates, formates, alcoxides and carbonates. Preferably, the acetates are employed. Sulfates are feasible, but often are not desirable because of the adverse effect that sulfates have on some desirable catalyst qualities such as activity and/or fouling rate. If it is desired that silica be present, the silica component can also be derived from sodium silicate, tetraethyl orthosilicate, silicon tetrachloride, and potassium silicate.

Following formation of the initial mixture, it is then coprecipitated, at a pH between 8.2 and 10.2, by conventional techniques. The precipitation ion be stepwise as by a form of titration, or simultaneous, as by mixing of metered solutions in the proper ratios. It is apparent from the above discussion that any precipitating agent should preferably not introduce any components in the mixture that are deleterious, i.e., sulfate or excess alkali, although chloride can be introduced if necessary, since the chloride content of the coprecipitate will be subsequently reduced by washing and anion exchange.

Following precipitation of the hydrous oxides, the excess liquid is removed, as by filtration. The resulting solid cake, still essentially composed of hydrous oxides, is then treated to remove impurities and to reduce the chloride content to the required level, for example by washing and 10⁻exchange. Washing can be done in one or more steps, using water or dilute aqueous solutions of ammonium salts of weak organic acids having a Dissociation Constant K of $10^{-4}$ or less. Said salts include ammonium formate, ammonium acetate, ammonium propionate and ammonium butyrate. Ammonium acetate is preferred. Salts of stronger organic acids are unsatisfactory because the resulting lower pH causes leaching out of valuable metals. Salts of organic acids should be used because organic acids are more decomposable than inorganic acids. During or after washing and recovery of the filter cake, the latter is preferably ion exchanged in the presence of formate ion, acetate ion, propionate ion, butyrate ion, or other similar organic ion derived from ammonium salts of weak organic acids having a Dissociation Constant K of $10^{-4}$ or less. The exact function of the formate, acetate or other ion during the anion exchanging step is unknown, but, when compared to catalysts prepared by coprecipitation methods where there is no such ion present during the exchanging operation, there is no doubt that the presence of the ion leads to catalysts having superior activities, regenerability and/or fouling rates. With catalysts containing certain components, as for example nickel, molybdenum and tungsten, the presence of the ion apparently provides a buffering action at a pH of about 7 which minimizes the loss of soluble metals during washing and/or anion exchange of the coprecipitate. The ion can be introduced into the procedure at any time up to, and including, the ion exchange step. Thus, the ion can be introduced into the initial mixture. In the case of acetate ion, for example, the ion can be introduced by acidifying with acetic acid or by employing soluble metal acetates, or in the washing liquid employed to wash the coprecipitate, or, for the first time, by employing ammonium acetate as the anion exchanger. Preferably, the ion is introduced into the initial mixture and also is present in the wash water in the washing step and also in any subsequent ion exchange step.

The treatment of the anhydrous oxides following precipitation (bearing in mind the requirement discussed above with respect to the presence of acetate or similar ion) in order to prepare a solid composite suitable for use as a catalyst, follows practices known in the art insofar as the actual steps of washing, anion exchange and aging are concerned. In any case, the finally washed, ion exchanged and filtered cake of coprecipitate in then dried, as for example in air or inert gases, at a temperature of from about 150° to 300° F. The coprecipitate is then calcined, generally at a temperature of from about 750° to 1,100° F., in the presence of an oxygen-containing gas. In catalysts wherein the hydrogenating component is at least one metal or compound of molybdenum, tungsten, nickel or cobalt incorporated within a coprecipitate containing silica as a component, for example silica in admixture with alumina, titania and molecular sieve, it is preferred to thermactivate (heat treat) the calcined composite by contact with an oxygen-containing gas stream at a temperature of from about 850° to 1,600° F., for a period in excess of about 0.25 hour.

The following examples will further illustrate the process of the present invention and various advantages thereof. Examples in Jaffe in U.S. Pat. No. 3,401,125, indicate the advantage of including titania in the catalyst composite. Therefore, the examples below will only indicate the advantage of the method of the present invention which are obtained by the presence of crystalline zeolitic molecular sieves in the initial mixture.

EXAMPLE 1

A molecular sieve-free catalyst (Catalyst A, a comparison catalyst) was prepared by precipitation from the acid side, as follows:

1. An aqueous aluminum chloride solution, acetic acid and titanium tetrachloride were combined.
2. An aqueous nickel chloride solution was added to the solution of step (1).
3. An aqueous sodium silicate solution was added to the solution from step (2), with a final pH below 2.
4. Dilute ammonium hydroxide was added to the solution of step (3) to raise the pH to about 5; precipitation occurred.
5. An aqueous sodium ammonium tungstate solution was added to the mixture of step (4).
6. Dilute ammonium hydroxide was added to the mixture of step (5) to raise the pH to about 7.
7. The catalyst was washed free of sodium and chloride, and filtered.
8. The catalyst was dried and calcined in flowing air at a terminal temperature of 950° F.

The final catalyst composite contained Ni:W:TiO$_2$:Al$_2$O$_3$:SiO$_2$ in the proportion 8:18:7:30:30.

EXAMPLE 2

A molecular sieve-free catalyst (Catalyst B, a comparison catalyst) is prepared by precipitation from the basic side, as follows:

1. An aqueous sodium silicate solution was prepared.
2. An aqueous solution of nickel chloride, titanium tetrachloride, and aluminum chloride was prepared.
3. The solution of step (2) was added to that of step (1), along with sufficient ammonium hydroxide to maintain the pH of the composite between 10.5 and 11 at all times.
4. Acetic acid was added to complete precipitation and to decrease the pH of the composite to about 5.
5. An aqueous sodium ammonium tungstate solution was added to the mixture of step (4).
6. Dilute ammonium hydroxide was added to the mixture of step (5) to raise the pH to about 7.
7. The catalyst was washed free of sodium and chloride, and filtered.

8. The catalyst was dried and calcined in flowing air at a terminal temperature of 950° F.

The final catalyst composition contained Ni:W:TiO$_2$:Al$_2$O$_3$ SiO$_2$ in the proportion 8:18:7:30:30.

Example 3

A molecular sieve-containing catalyst (Catalyst C, a comparison catalyst) was prepared by precipitation from the acid side, exactly as described in example 1, except Linde 'Y' faujasite was added just prior to adding sodium ammonium tungstate in step (5). All other steps were identical to those of example 1. The final catalyst composite consisted of a matrix of the same composition as Catalyst A of example 1, diluted by dispersion of 10 percent zeolite.

Example 4

A molecular sieve-containing catalyst (Catalyst D, according to the present invention) was prepared by precipitation from the basic side, exactly as described in example 2, except Linde 'Y' faujasite was added to the sodium silicate solution of step (1). All other steps were identical to those of example 2. The final catalyst composite consisted of a matrix of the same composition as Catalyst B, diluted by dispersion of 10 percent zeolite. It is felt that this catalyst is improved over the prior art Catalyst C in that the dispersion of the zeolite in the matrix is improved.

Example 5

Portions of Catalysts A and B of examples 1 and 2, respectively, are used to hydrocrack separate portions of a California gas oil feedstock, on a once-through basis.

The gas oil feedstock has the following characteristics:

| | |
|---|---|
| Gravity, °API | 19.8 |
| Boiling Range, °F. | 498–884 |
| Organic nitrogen content, p.p.m. | 2,980 |

The hydrocracking conditions are:

| | |
|---|---|
| Total pressure, p.s.i.g. | 1600 |
| Total hydrogen rate, SCF/bbl. | 10,000 |
| Liquid hourly space velocity, V/V/hr. | 0.8 |
| Conversion to products boiling below 550° F., liquid volume % | 60 |

The hydrocracking activities of the two catalysts, as measured by the starting temperatures necessary to achieve the indicated conversion, and the stabilities of these catalysts, as measured by the rate of increase of catalyst temperature required to maintain this conversion as the catalyst fouls are:

| | Activity, °F. | Fouling Rate, °F./hr. |
|---|---|---|
| Catalyst A | 775 | 0.06 |
| Catalyst B | 775 | 0.09 |

Hence, the precipitation from the acid side provides the superior catalyst if molecular sieves are not included. This is probably due to the improved dispersion of the metals in the catalyst in the carefully controlled acidic precipitation.

Example 6

Portions of Catalysts C and D of examples 3 and 4, respectively, were used to hydrocrack separate portions of a California gas oil feedstock, on a once-through basis.

The gas oil feedstock had the following characteristics:

| | |
|---|---|
| Gravity, °API | 19.8 |
| Boiling range, °F. | 498–884 |
| Organic nitrogen content, p.p.m. | 2,980 |

The hydrocracking conditions were:

| | |
|---|---|
| Total pressure, p.s.i.g. | 1,300 |
| Total hydrogen rate, SCF/bbl. | 10,000 |
| Liquid hourly space velocity, V/V/hr. | 0.8 |
| Conversion to products boiling below 550° F., liquid volume % | 60 |

The hydrocracking activities of the two catalysts, as measured by the starting temperatures necessary to achieve the indicated conversion, and the stabilities of the catalysts, as measured by the rate of increase of catalyst temperature required to maintain this conversion as the catalyst fouls, were:

| | Activity, °F. | Fouling Rate, °F./hr. |
|---|---|---|
| Catalyst C | 770 | 0.07 |
| Catalyst D | 770 | 0.025 |

Note that these tests of example 6 are conducted at 200 p.s.i. lower pressure than those of example 5; generally this lower pressure causes a 4- to 6-fold increase in fouling, so Catalysts C and D are seen to be substantially more stable than Catalysts A and B. It is apparent that the primary result of the presence of the molecular sieves is in improving catalyst stability, and not activity. Therefore, because the molecular sieve component limits the fouling rate, it can be seen that the method of catalyst preparation of the present invention can overcome the inferior matrix (Catalyst B vs. Catalyst A) due to the improved distribution of the zeolite to produce the best catalyst (Catalyst D vs. Catalyst C).

As has been described and exemplified above, the present catalyst preparation method is particularly suitable for producing hydrofining, i.e., hydrodenitrification and hydrodesulfurization, catalyst and for producing hydrocracking catalysts. The specific conditions for conducting these various reactions are well known in the art. However, these reactions have many features in common and are herein generically termed "hydroprocessing reactions." These reactions all are directed to the conversion of hydrocarbonaceous material and are conducted in the presence of added hydrogen since these reactions will all consume at least 250 SCF of hydrogen per barrel of feed contacted. The reaction temperatures will be in the range of from about 500° to 1,000° F., preferably from about 500° to 900° F., and reaction pressures will be in the range of from about 200 to over 3,000 p.s.i.g., and preferably in the range of from about 300 to 2,500 p.s.i.g., depending upon the particular feed employed. Feed rates will generally be in the range of from about 0.1 to 10.0 LHSV. Catalysts prepared by the present method are especially suited for use in such hydroprocessing reactions.

What is claimed is:

1. A method for producing a coprecipitated solid comprising a crystalline zeolitic molecular sieve, at least one metal oxide having isomerization activity, at least one hydrogenating component, and a component comprising titanium which comprises:
    1. providing a mixture comprising said crystalline zeolitic molecular sieve, a precursor compound of said metal oxide, a precursor compound of said hydrogenating component, and a compound of titanium, at least one of said compounds being a metal chloride, said mixture having a pH above about 10.2;
    2. coprecipitating said mixture by lowering the pH of the mixture to fall within the range from 8.2 to 10.2;
    3. reducing the chloride content of the resulting coprecipitate below about 0.25 percent of the total weight thereof;
    4. drying the resulting hydrogel coprecipitate containing said crystalline zeolitic molecular sieve to produce said coprecipitated solid.
2. The method as in claim 1 wherein said precursor compound of said hydrogenating component is a compound of nickel.
3. The method as in claim 2, wherein said mixture contains a compound of tungsten.

* * * * *